(12) United States Patent
Silver et al.

(10) Patent No.: US 12,141,677 B2
(45) Date of Patent: Nov. 12, 2024

(54) ENVIRONMENT PREDICTION USING REINFORCEMENT LEARNING

(71) Applicant: DeepMind Technologies Limited, London (GB)

(72) Inventors: David Silver, Hitchin (GB); Tom Schaul, London (GB); Matteo Hessel, London (GB); Hado Philip van Hasselt, London (GB)

(73) Assignee: DeepMind Technologies Limited, London (GB)

(*) Notice: Subject to any disclaimer, the term of this patent is extended or adjusted under 35 U.S.C. 154(b) by 829 days.

(21) Appl. No.: 16/911,992

(22) Filed: Jun. 25, 2020

(65) Prior Publication Data

US 2020/0327399 A1    Oct. 15, 2020

Related U.S. Application Data

(63) Continuation of application No. 16/403,314, filed on May 3, 2019, now Pat. No. 10,733,501, which is a
(Continued)

(51) Int. Cl.
*G06N 3/045* (2023.01)
*G05B 13/02* (2006.01)
(Continued)

(52) U.S. Cl.
CPC ........... *G06N 3/045* (2023.01); *G05B 13/027* (2013.01); *G06N 3/006* (2013.01); *G06N 3/044* (2023.01);
(Continued)

(58) Field of Classification Search
CPC .... G06N 3/0454; G06N 3/006; G06N 3/0445; G06N 3/0472; G06N 3/08; G06N 3/10;
(Continued)

(56) References Cited

U.S. PATENT DOCUMENTS

| | | | | |
|---|---|---|---|---|
| 8,775,341 B1 * | 7/2014 | Commons | ........... | G06F 16/3344 706/20 |
| 9,015,093 B1 * | 4/2015 | Commons | .......... | G01C 21/3602 706/26 |

(Continued)

FOREIGN PATENT DOCUMENTS

| | | |
|---|---|---|
| CN | 106056213 | 10/2016 |
| WO | WO 2004/068399 | 8/2004 |

OTHER PUBLICATIONS

M. Khosravi and A. G. Aghdam, "Stability analysis of dynamic decision-making for vehicle heading control," 2015 American Control Conference (ACC), 2015, pp. 3076-3081, doi: 10.1109/ACC.2015.7171805. (Year: 2015).*
(Continued)

*Primary Examiner* — Charles L Beard
(74) *Attorney, Agent, or Firm* — Fish & Richardson P.C.

(57) ABSTRACT

Methods, systems, and apparatus, including computer programs encoded on a computer storage medium, for prediction of an outcome related to an environment. In one aspect, a system comprises a state representation neural network that is configured to: receive an observation characterizing a state of an environment being interacted with by an agent and process the observation to generate an internal state representation of the environment state; a prediction neural network that is configured to receive a current internal state representation of a current environment state and process the current internal state representation to generate a predicted subsequent state representation of a subsequent state of the environment and a predicted reward for the subsequent state; and a value prediction neural network that is configured to receive a current internal state representation of a current environment state and process the current internal state representation to generate a value prediction.

20 Claims, 3 Drawing Sheets

Related U.S. Application Data continuation of application No. PCT/IB2017/056902, filed on Nov. 4, 2017.

(60) Provisional application No. 62/418,159, filed on Nov. 4, 2016.

(51) Int. Cl.

| | | |
|---|---|---|
| *G06N 3/006* | (2023.01) | |
| *G06N 3/044* | (2023.01) | |
| *G06N 3/047* | (2023.01) | |
| *G06N 3/08* | (2023.01) | |
| *G06N 3/10* | (2006.01) | |
| *G06T 1/20* | (2006.01) | |
| *G06N 3/084* | (2023.01) | |

(52) U.S. Cl.
CPC ............... *G06N 3/047* (2023.01); *G06N 3/08* (2013.01); *G06N 3/10* (2013.01); *G06T 1/20* (2013.01); *G06N 3/084* (2013.01)

(58) Field of Classification Search
CPC ........ G06N 3/084; G06N 3/045; G06N 3/047; G06N 3/044; G05B 13/027; G06T 1/20
See application file for complete search history.

(56) References Cited

U.S. PATENT DOCUMENTS

| | | | | |
|---|---|---|---|---|
| 9,536,191 | B1* | 1/2017 | Arel | G06N 20/00 |
| 10,379,538 | B1* | 8/2019 | Sheckells | G05D 1/0217 |
| 10,564,801 | B2* | 2/2020 | Baba | G06T 19/20 |
| 10,581,885 | B1* | 3/2020 | Oh | G06N 3/08 |
| 10,606,898 | B2* | 3/2020 | Tellex | G06F 16/90332 |
| 10,691,997 | B2* | 6/2020 | Graves | G06N 3/045 |
| 10,700,935 | B1* | 6/2020 | Mousavi | G06N 20/00 |
| 10,803,525 | B1* | 10/2020 | Augustine | G06Q 40/08 |
| 10,831,210 | B1* | 11/2020 | Kobilarov | B60W 60/0013 |
| 10,867,242 | B2* | 12/2020 | Graepel | G06N 3/045 |
| 10,885,432 | B1* | 1/2021 | Dulac-Arnold | G06N 3/006 |
| 10,926,408 | B1* | 2/2021 | Vogelsong | B25J 9/163 |
| 11,049,010 | B2* | 6/2021 | Dani | G06F 18/2413 |
| 11,080,587 | B2* | 8/2021 | Gregor | G06N 3/044 |
| 11,080,591 | B2* | 8/2021 | van den Oord | G06N 3/084 |
| 11,080,594 | B2* | 8/2021 | Sutskever | G06F 3/0673 |
| 11,144,847 | B1* | 10/2021 | Reynders, III | G06N 3/006 |
| 11,188,821 | B1* | 11/2021 | Kalakrishnan | G06N 3/063 |
| 11,429,845 | B1* | 8/2022 | Angelov | G06N 3/10 |
| 11,449,750 | B2* | 9/2022 | Simonyan | G06N 3/08 |
| 11,500,099 | B2* | 11/2022 | Liang | G06N 3/02 |
| 11,519,742 | B2* | 12/2022 | Voznesensky | B60W 40/06 |
| 11,521,056 | B2* | 12/2022 | Fyffe | G06F 30/20 |
| 11,537,872 | B2* | 12/2022 | Pham | G06N 3/045 |
| 11,627,165 | B2* | 4/2023 | Silver | H04L 63/205 726/1 |
| 11,670,420 | B2* | 6/2023 | Ling | G06N 20/00 705/2 |
| 11,715,007 | B2* | 8/2023 | Dalli | G06N 3/006 706/15 |
| 11,727,264 | B2* | 8/2023 | Gendron-Bellemare | G06N 3/047 706/15 |
| 11,734,575 | B2* | 8/2023 | Agravante | G06N 3/088 706/21 |
| 11,803,750 | B2* | 10/2023 | Lillicrap | G06N 3/045 |
| 2006/0155664 | A1 | 7/2006 | Morikawa | |
| 2012/0296656 | A1* | 11/2012 | Smyth | G10L 19/22 704/E21.001 |
| 2012/0296658 | A1* | 11/2012 | Smyth | G10L 19/22 704/500 |
| 2013/0246318 | A1* | 9/2013 | Kobayashi | G06N 20/00 706/12 |
| 2015/0262205 | A1* | 9/2015 | Theocharous | G06Q 30/0202 705/7.31 |
| 2015/0278725 | A1* | 10/2015 | Mizuta | G06Q 30/0244 705/7.12 |
| 2015/0365871 | A1* | 12/2015 | Hu | H04W 72/0453 370/331 |
| 2016/0086222 | A1* | 3/2016 | Kurapati | G06Q 40/08 705/14.53 |
| 2017/0024643 | A1* | 1/2017 | Lillicrap | G06V 10/82 |
| 2017/0061283 | A1* | 3/2017 | Rasmussen | G06N 3/088 |
| 2017/0076201 | A1* | 3/2017 | van Hasselt | G06N 3/08 |
| 2017/0091672 | A1* | 3/2017 | Sasaki | H02P 23/0031 |
| 2017/0103305 | A1 | 4/2017 | Henry | |
| 2017/0111000 | A1* | 4/2017 | Saito | H02P 27/06 |
| 2017/0117841 | A1* | 4/2017 | Watanabe | G06N 5/045 |
| 2017/0140259 | A1* | 5/2017 | Bergstra | G06N 3/044 |
| 2017/0140266 | A1* | 5/2017 | Wang | G06N 3/092 |
| 2017/0140269 | A1* | 5/2017 | Schaul | G06N 3/08 |
| 2017/0154261 | A1* | 6/2017 | Sunehag | G06N 3/08 |
| 2017/0154283 | A1* | 6/2017 | Kawai | G06F 11/006 |
| 2017/0213150 | A1* | 7/2017 | Arel | G06N 3/042 |
| 2017/0220927 | A1* | 8/2017 | Takigawa | B23K 26/38 |
| 2017/0228644 | A1* | 8/2017 | Kurokawa | G06N 3/04 |
| 2017/0228662 | A1* | 8/2017 | Gu | G06N 3/045 |
| 2017/0234689 | A1* | 8/2017 | Gibson | G01C 21/3461 701/25 |
| 2017/0262772 | A1* | 9/2017 | Takigawa | H01S 5/02423 |
| 2017/0277174 | A1* | 9/2017 | Maeda | G05B 19/41875 |
| 2017/0364829 | A1* | 12/2017 | Fyffe | G06N 3/006 |
| 2018/0003588 | A1* | 1/2018 | Iwanami | G06N 5/04 |
| 2018/0018580 | A1* | 1/2018 | Coppin | G06F 16/9535 |
| 2018/0026573 | A1* | 1/2018 | Akashi | H02P 21/13 318/6 |
| 2018/0032082 | A1* | 2/2018 | Shalev-Shwartz | G01C 21/3453 |
| 2018/0032841 | A1* | 2/2018 | Kluckner | G16H 40/63 |
| 2018/0079076 | A1* | 3/2018 | Toda | G05B 13/029 |
| 2018/0089563 | A1* | 3/2018 | Redding | G06N 5/01 |
| 2018/0100662 | A1* | 4/2018 | Farahmand | G05B 19/0428 |
| 2018/0120843 | A1* | 5/2018 | Berntorp | G06V 20/56 |
| 2018/0129974 | A1* | 5/2018 | Giering | G05B 13/027 |
| 2018/0165603 | A1* | 6/2018 | Van Seijen | G06N 3/045 |
| 2018/0165745 | A1* | 6/2018 | Zhu | G06Q 30/0631 |
| 2018/0253837 | A1* | 9/2018 | Ghesu | G06T 7/0012 |
| 2018/0260689 | A1* | 9/2018 | Wang | G06N 3/047 |
| 2018/0262519 | A1* | 9/2018 | Arunkumar | G06F 16/258 |
| 2018/0284768 | A1* | 10/2018 | Wilkinson | G05D 1/228 |
| 2019/0033085 | A1* | 1/2019 | Ogale | G01C 21/3446 |
| 2019/0033839 | A1* | 1/2019 | Kuwabara | G05B 19/41875 |
| 2019/0034794 | A1* | 1/2019 | Ogale | G05D 1/0212 |
| 2019/0049970 | A1* | 2/2019 | Djuric | G06N 20/00 |
| 2019/0064756 | A1* | 2/2019 | Tajima | G01L 5/24 |
| 2019/0113929 | A1* | 4/2019 | Mukadam | G08G 1/167 |
| 2019/0116560 | A1* | 4/2019 | Naderializadeh | H04W 24/02 |
| 2019/0232488 | A1* | 8/2019 | Levine | G05B 13/027 |
| 2019/0244099 | A1* | 8/2019 | Schaul | G06N 3/08 |
| 2019/0258918 | A1* | 8/2019 | Wang | G06N 3/084 |
| 2019/0258938 | A1* | 8/2019 | Mnih | G06N 3/084 |
| 2019/0259051 | A1* | 8/2019 | Silver | G06T 1/20 |
| 2019/0266449 | A1* | 8/2019 | Viola | G06F 18/217 |
| 2019/0272558 | A1* | 9/2019 | Suzuki | G06N 7/01 |
| 2019/0303764 | A1* | 10/2019 | Uria-Martínez | G06N 3/006 |
| 2019/0310650 | A1* | 10/2019 | Halder | G06N 3/08 |
| 2019/0317457 | A1* | 10/2019 | Shinoda | G05B 19/4063 |
| 2019/0332920 | A1* | 10/2019 | Sermanet | G06N 3/08 |
| 2019/0332922 | A1* | 10/2019 | Nachum | G06N 3/08 |
| 2019/0332923 | A1* | 10/2019 | Gendron-Bellemare | G06N 3/006 |
| 2019/0354869 | A1* | 11/2019 | Warde-Farley | G06N 3/08 |
| 2019/0382007 | A1* | 12/2019 | Casas | G06V 10/764 |
| 2020/0004259 | A1* | 1/2020 | Gulino | G05D 1/0221 |
| 2020/0018609 | A1* | 1/2020 | Nagy | G05D 1/0088 |
| 2020/0034701 | A1* | 1/2020 | Ritter | G06F 9/5005 |
| 2020/0042901 | A1* | 2/2020 | Chen | G06N 3/08 |
| 2020/0057416 | A1* | 2/2020 | Matsubara | G06N 20/10 |
| 2020/0061811 | A1* | 2/2020 | Iqbal | G06N 3/08 |
| 2020/0074241 | A1* | 3/2020 | Mahmood | G06V 10/96 |
| 2020/0082227 | A1* | 3/2020 | Wierstra | G06N 3/084 |
| 2020/0082248 | A1* | 3/2020 | Villegas | G06N 3/044 |
| 2020/0097808 | A1* | 3/2020 | Thomas | G06Q 10/063 |
| 2020/0104645 | A1* | 4/2020 | Ionescu | G06N 3/044 |

(56) References Cited

U.S. PATENT DOCUMENTS

| | | | |
|---|---|---|---|
| 2020/0104680 A1* | 4/2020 | Reed | G06V 10/764 |
| 2020/0104684 A1* | 4/2020 | Vecerik | G06N 3/047 |
| 2020/0104709 A1* | 4/2020 | Mohammadi | G06N 3/044 |
| 2020/0104743 A1* | 4/2020 | Tsuneki | G06N 3/006 |
| 2020/0114506 A1* | 4/2020 | Toshev | G06N 3/008 |
| 2020/0117956 A1* | 4/2020 | Wayne | G06F 18/2193 |
| 2020/0126015 A1* | 4/2020 | Anandan Kartha | G06Q 10/087 |
| 2020/0134445 A1* | 4/2020 | Che | G06N 3/006 |
| 2020/0150599 A1* | 5/2020 | Tsuneki | G05B 13/0265 |
| 2020/0150671 A1* | 5/2020 | Fan | B60W 60/0011 |
| 2020/0159215 A1* | 5/2020 | Ding | G06N 3/045 |
| 2020/0164514 A1* | 5/2020 | Kaneko | B25J 9/1633 |
| 2020/0174471 A1* | 6/2020 | Du | H04W 4/44 |
| 2020/0174472 A1* | 6/2020 | Zhang | G06N 3/084 |
| 2020/0174490 A1* | 6/2020 | Ogale | G06N 3/045 |
| 2020/0175364 A1* | 6/2020 | Xu | G06N 3/045 |
| 2020/0175691 A1* | 6/2020 | Zhang | G06T 7/248 |
| 2020/0234113 A1* | 7/2020 | Liu | G06N 7/01 |
| 2020/0244816 A1* | 7/2020 | Ukita | H04N 1/0032 |
| 2020/0272905 A1* | 8/2020 | Saripalli | G06N 3/082 |
| 2020/0285940 A1* | 9/2020 | Sprechmann | G06N 3/006 |
| 2020/0293057 A1* | 9/2020 | Reid | G06N 20/20 |
| 2020/0293883 A1* | 9/2020 | Budden | G06N 3/045 |
| 2020/0302322 A1* | 9/2020 | Tukiainen | G06N 7/01 |
| 2020/0310420 A1* | 10/2020 | Scorcioni | B60W 50/0098 |
| 2020/0320397 A1* | 10/2020 | Liu | H04L 67/34 |
| 2020/0331465 A1* | 10/2020 | Herman | G08G 1/165 |
| 2020/0338722 A1* | 10/2020 | Jang | G06N 3/08 |
| 2020/0342356 A1* | 10/2020 | Bao | G06N 20/00 |
| 2020/0361083 A1* | 11/2020 | Mousavian | G06N 3/063 |
| 2020/0365015 A1* | 11/2020 | Nguyen | G08G 1/0129 |
| 2020/0372370 A1* | 11/2020 | Donahue | G06N 3/084 |
| 2020/0377090 A1* | 12/2020 | Seccamonte | B60W 60/0011 |
| 2020/0388166 A1* | 12/2020 | Rostamzadeh | G06N 7/01 |
| 2021/0001897 A1* | 1/2021 | Chai | G06N 3/045 |
| 2021/0004006 A1* | 1/2021 | Graves | B60W 30/0956 |
| 2021/0034970 A1* | 2/2021 | Soyer | G06N 3/092 |
| 2021/0042338 A1* | 2/2021 | Smutko | G06F 11/3438 |
| 2021/0046923 A1* | 2/2021 | Olson | B60W 30/095 |
| 2021/0046926 A1* | 2/2021 | Olson | B60W 50/029 |
| 2021/0048817 A1* | 2/2021 | Olson | B60W 30/00 |
| 2021/0049498 A1* | 2/2021 | Liu | G06N 10/00 |
| 2021/0073282 A1* | 3/2021 | Hunter | G06N 3/086 |
| 2021/0078169 A1* | 3/2021 | Cabi | B25J 9/163 |
| 2021/0089908 A1* | 3/2021 | Schaul | G06F 18/2415 |
| 2021/0103255 A1* | 4/2021 | Jha | G05B 13/042 |
| 2021/0104171 A1* | 4/2021 | White | G06N 3/006 |
| 2021/0110115 A1* | 4/2021 | Hermann | G06N 3/045 |
| 2021/0110271 A1* | 4/2021 | Gendron-Bellemare | G06N 3/092 |
| 2021/0117786 A1* | 4/2021 | Schwarz | G06N 20/20 |
| 2021/0122037 A1* | 4/2021 | Rozo | G06N 3/006 |
| 2021/0133582 A1* | 5/2021 | Refaat | G06N 3/084 |
| 2021/0133583 A1* | 5/2021 | Chetlur | G10L 15/16 |
| 2021/0133633 A1* | 5/2021 | Poornachandran | G06N 20/00 |
| 2021/0139026 A1* | 5/2021 | Phan | G08G 1/0968 |
| 2021/0174678 A1* | 6/2021 | Wright | G06F 9/5072 |
| 2021/0181754 A1* | 6/2021 | Cui | G06N 3/088 |
| 2021/0187733 A1* | 6/2021 | Lee | B25J 9/163 |
| 2021/0192287 A1* | 6/2021 | Dwivedi | G06F 9/3877 |
| 2021/0229707 A1* | 7/2021 | Akash | B60K 35/28 |
| 2021/0241090 A1* | 8/2021 | Chen | H04W 24/02 |
| 2021/0260758 A1* | 8/2021 | Singh | B25J 9/1651 |
| 2021/0263526 A1* | 8/2021 | Helbig | G05D 1/0221 |
| 2021/0264269 A1* | 8/2021 | Sato | G06N 3/088 |
| 2021/0268653 A1* | 9/2021 | Tian | B25J 9/1664 |
| 2021/0294323 A1* | 9/2021 | Bentahar | B60W 50/00 |
| 2021/0319362 A1* | 10/2021 | Mguni | G06N 20/00 |
| 2021/0325894 A1* | 10/2021 | Faust | G06N 3/008 |
| 2021/0327578 A1* | 10/2021 | Buchard | G16H 50/30 |
| 2021/0334654 A1* | 10/2021 | Himanshi | G06N 3/08 |
| 2021/0335344 A1* | 10/2021 | Park | G10L 15/1822 |
| 2021/0338351 A1* | 11/2021 | Blondel | A61B 34/30 |
| 2021/0356965 A1* | 11/2021 | Forster | G01C 21/3453 |
| 2021/0357731 A1* | 11/2021 | Van de Wiele | G06N 3/084 |
| 2021/0383218 A1* | 12/2021 | Lu | G06N 3/08 |
| 2021/0390409 A1* | 12/2021 | Geist | G06N 3/08 |
| 2021/0397959 A1* | 12/2021 | Pietquin | G06N 3/08 |
| 2021/0402598 A1* | 12/2021 | Terasawa | B25J 9/1612 |
| 2022/0027817 A1* | 1/2022 | Hubbs | G06Q 10/087 |
| 2022/0027837 A1* | 1/2022 | D'Attilio | H04M 3/5175 |
| 2022/0032949 A1* | 2/2022 | Thomas | G05D 1/0214 |
| 2022/0035375 A1* | 2/2022 | Rezaee | G06N 3/08 |
| 2022/0040852 A1* | 2/2022 | Abdou | B25J 9/1664 |
| 2022/0050714 A1* | 2/2022 | Grimshaw | G06F 9/4856 |
| 2022/0053012 A1* | 2/2022 | Nishijima | H04L 63/1441 |
| 2022/0067850 A1* | 3/2022 | Bhasme | H02J 7/00716 |
| 2022/0129708 A1* | 4/2022 | Gamzo | G06V 10/82 |
| 2022/0147876 A1* | 5/2022 | Dalli | G06N 20/00 |
| 2022/0152826 A1* | 5/2022 | Danielczuk | G06V 10/82 |
| 2022/0164657 A1* | 5/2022 | He | G06N 3/084 |
| 2022/0188695 A1* | 6/2022 | Zhu | G06N 20/00 |
| 2022/0196414 A1* | 6/2022 | Wang | G05B 13/027 |
| 2022/0197280 A1* | 6/2022 | Venkatadri | B60W 50/00 |
| 2022/0204055 A1* | 6/2022 | Watterson | B60W 60/00276 |
| 2022/0207337 A1* | 6/2022 | Kim | G06N 3/048 |
| 2022/0214693 A1* | 7/2022 | Narang | G05D 1/0214 |
| 2022/0222508 A1* | 7/2022 | Takac | G06N 3/08 |
| 2022/0234651 A1* | 7/2022 | Wu | B62D 15/025 |
| 2022/0236737 A1* | 7/2022 | Narang | G06N 3/045 |
| 2022/0237488 A1* | 7/2022 | Wulfmeier | G06N 7/01 |
| 2022/0245513 A1* | 8/2022 | Wang | H04L 67/1097 |
| 2022/0261635 A1* | 8/2022 | Anthony | G06N 3/08 |
| 2022/0269937 A1* | 8/2022 | Kim | G06N 3/08 |
| 2022/0269948 A1* | 8/2022 | Grigorescu | G06V 10/774 |
| 2022/0270488 A1* | 8/2022 | Tang | G06N 3/084 |
| 2022/0276657 A1* | 9/2022 | Huh | G05D 1/0246 |
| 2022/0279183 A1* | 9/2022 | Besenbruch | G06T 3/4046 |
| 2022/0284035 A1* | 9/2022 | Butterstein | G06F 11/1471 |
| 2022/0284261 A1* | 9/2022 | Lillo | G06N 3/04 |
| 2022/0291666 A1* | 9/2022 | Cella | B25J 9/163 |
| 2022/0297304 A1* | 9/2022 | Stramandinoli | G06N 7/01 |
| 2022/0300851 A1* | 9/2022 | Park | G06N 5/04 |
| 2022/0305647 A1* | 9/2022 | Piergiovanni | G06N 3/045 |
| 2022/0305649 A1* | 9/2022 | Perez | G06N 3/08 |
| 2022/0309336 A1* | 9/2022 | Minkin | G06N 3/08 |
| 2022/0314446 A1* | 10/2022 | Gienger | B25J 9/1664 |
| 2022/0315000 A1* | 10/2022 | Wray | B60W 60/001 |
| 2022/0318557 A1* | 10/2022 | Mohseni | G06V 20/56 |
| 2022/0326664 A1* | 10/2022 | Kaberg Johard | G06N 3/006 |
| 2022/0331962 A1* | 10/2022 | Pirk | G06F 18/24143 |
| 2022/0335624 A1* | 10/2022 | Maurer | G06N 3/08 |
| 2022/0340171 A1* | 10/2022 | Halder | G05D 1/0274 |
| 2022/0343157 A1* | 10/2022 | Mankowitz | G06N 3/08 |
| 2022/0355825 A1* | 11/2022 | Deo | G06N 3/084 |
| 2022/0358749 A1* | 11/2022 | Yonetani | G06N 3/08 |
| 2022/0360854 A1* | 11/2022 | Gao | H04N 21/4662 |
| 2022/0363259 A1* | 11/2022 | Shi | B60W 60/001 |
| 2022/0366220 A1* | 11/2022 | Roth | G06N 3/08 |
| 2022/0366235 A1* | 11/2022 | Cassirer | G06N 3/08 |
| 2022/0366245 A1* | 11/2022 | Guez | G06V 10/82 |
| 2022/0366246 A1* | 11/2022 | Danihelka | G06N 3/08 |
| 2022/0366247 A1* | 11/2022 | Hamrick | G06N 3/04 |
| 2022/0366263 A1* | 11/2022 | Ji | G06N 3/08 |
| 2022/0373980 A1* | 11/2022 | Anthony | G06F 18/214 |
| 2022/0379918 A1* | 12/2022 | Osawa | B60W 50/0097 |
| 2022/0382279 A1* | 12/2022 | Wray | G05D 1/0088 |
| 2022/0383019 A1* | 12/2022 | Tremblay | G06V 40/11 |
| 2022/0383074 A1* | 12/2022 | Strathmann | G06N 3/09 |
| 2022/0383075 A1* | 12/2022 | Radovic | G06N 3/08 |
| 2022/0398283 A1* | 12/2022 | Mannor | G06N 3/006 |
| 2023/0025154 A1* | 1/2023 | Kumar | G05D 1/0088 |
| 2023/0075473 A1* | 3/2023 | Eklund | G06N 3/0464 |
| 2023/0083486 A1* | 3/2023 | Guo | G06N 3/044 706/21 |
| 2023/0102544 A1* | 3/2023 | Agarwal | G06N 3/006 706/23 |
| 2023/0108874 A1* | 4/2023 | Morlot | G06N 20/00 706/12 |
| 2023/0121913 A1* | 4/2023 | Gurumurthy | G06N 3/08 701/24 |
| 2023/0217264 A1* | 7/2023 | Challita | G06N 7/01 370/329 |

(56) References Cited

U.S. PATENT DOCUMENTS

| | | | | |
|---|---|---|---|---|
| 2023/0237342 | A1* | 7/2023 | Mannor | G06N 5/01 |
| | | | | 706/25 |
| 2023/0288607 | A1* | 9/2023 | Yang | G01W 1/10 |
| 2023/0368026 | A1* | 11/2023 | Cox | G06N 3/006 |
| 2023/0376697 | A1* | 11/2023 | Chow | G06N 3/047 |
| 2023/0376780 | A1* | 11/2023 | Gulcehre | G06N 3/044 |
| 2023/0376961 | A1* | 11/2023 | Nair | G06Q 20/382 |
| 2024/0070485 | A1* | 2/2024 | Weinberg | G06N 3/044 |
| 2024/0080270 | A1* | 3/2024 | Wang | H04L 47/12 |
| 2024/0232572 | A1* | 7/2024 | Wang | G06F 18/2193 |

OTHER PUBLICATIONS

B. D. Ziebart, "Factorized decision forecasting via combining value-based and reward-based estimation," 2011 49th Annual Allerton Conference on Communication, Control, and Computing (Allerton), 2011, pp. 966-973, doi: 10.1109/Allerton.2011.6120271. (Year: 2011).*

Watkins, C.J.C.H., Dayan, P. Q-learning. Mach Learn 8, 279-292 (1992). https://doi.org/10.1007/BF00992698 (Year: 1992).*

Sutton, Richard S., and Andrew G. Barto. Reinforcement learning: An introduction. MIT press, 2015. (Year: 2015).*

Van Hasselt, Hado & Mahmood, A. & Sutton, Richard. (2014). Off-policy TD($\lambda$) with a true online equivalence. Uncertainty in Artificial Intelligence—Proceedings of the 30th Conference, UAI 2014. (Year: 2014).*

Sutton, R., Mahmood, A.R., Precup, D. & Hasselt, H.. (2014). A new Q(lambda) with interim forward view and Monte Carlo equivalence. Proceedings of the 31st International Conference on Machine Learning, in Proceedings of Machine Learning Research 32(2):568-576 (Year: 2014).*

Hasselt, Hado. "Double Q-learning." Advances in neural information processing systems 23 (2010). (Year: 2010).*

D. Luviano Cruz and W. Yu, "Multi-agent path planning in unknown environment with reinforcement learning and neural network," 2014 IEEE International Conference on Systems, Man, and Cybernetics (SMC), San Diego, CA, USA, 2014, pp. 3458-3463, doi: 10.1109/SMC.2014.6974464. (Year: 2014).*

F. Cruz, S. Magg, C. Weber and S. Wermter, "Training Agents With Interactive Reinforcement Learning and Contextual Affordances," in IEEE Transactions on Cognitive and Developmental Systems, vol. 8, No. 4, pp. 271-284, Dec. 2016, doi: 10.1109/TCDS.2016.2543839. (Year: 2016).*

M. Kusy and R. Zajdel, "Application of Reinforcement Learning Algorithms for the Adaptive Computation of the Smoothing Parameter for Probabilistic Neural Network," in IEEE Transactions on Neural Networks and Learning Systems, vol. 26, No. 9, pp. 2163-2175, Sep. 2015, doi: 10.1109/TNNLS.2014.2376703. (Year: 2015).*

EP Office Action in European Appln. 17807934.9-1221, dated Jun. 29, 2021, 10 pages.

JP Notice of Allowance in Japanese Appln. No. 2020-111559, dated Jun. 28, 2021, 5 pages (with English translation).

Baird, "Residual algorithms: Reinforcement learning with function approximation," Machine Learning: Proceedings of the Twelfth International Conference, 1996, pp. 30-37.

Glorot et al., "Deep sparse rectifier neural networks," Aistats, 2011, pp. 315-323.

Graves, "Adaptive Computation Time for Recurrent Neural Networks," arXiv preprint arXiv:1603.08983, 2016, 19 pages.

He et al., "Deep residual learning for image recognition," arXiv preprint arXiv:1512.03385, 2015, pp. 770-778.

Ioffe & Szegedy, "Batch normalization: Accelerating deep network training by reducing internal covariate shift," arXiv preprint arXiv:1502.03167, 2015, 11 pages.

JP Notice of Allowance in Japanese Appln. No. 2019-523612, dated Jun. 1, 2020, 5 pages (with English translation).

Kingma & Ba, "A method for stochastic optimization," International Conference on Learning Representation, 2015, 15 pages.

Laud, Adam Daniel, Theory and Application of Reward Shaping in Reinforcement Learning, 2004 University of Illinois at Urbana-Champaign (Year: 2004).

Lee et al., "Deeply-Supervised Nets," Artificial Intelligence and Statistics, 2015, pp. 562-570.

Lillicrap et al, "Continuous control with deep reinforcement learning," ICLR, 2016.

Mnih et al, "Asynchronous methods for deep reinforcement learning," International Conference on Machine Learning, 2016, 10 pages.

Mnih et al, "Human-level control through deep reinforcement learning," Nature, 2015, pp. 518(7540):529-533.

Oh et al, "Action-conditional video prediction using deep networks in atari games," Advances in Neural Information Processing Systems, 2015, pp. 2863-2871.

PCT International Preliminary Report on Patentability in International Appln. No. PTCT/IB2017/056902, dated May 16, 2019, 10 pages.

PCT International Search Report and Written Opinion in International Appln. No. PCT/IB2017/056902, dated Feb. 26, 2018, 16 pages.

Schmidhuber, "On Learning to Think: Algorithmic Information Theory for Novel Combinations of Reinforcement Learning Controllers and Recurrent Neural World Models," CORR, 2015, 36 pages.

Sutton, "Integrated architectures for learning, planning and reacting based on dynamic programming," Machine Learning: Proceedings of the Seventh International Workshop, 1990, pp. 216-224.

Sutton, "Learning to predict by the methods of temporal differences," Machine Learning, 1988, pp. 3:9-44.

Tamar et al, "Value Iteration Networks," Advances in Neural Information Processing Systems, 2016, 2016, 14 pages.

Watkins, "Learning from Delayed Rewards," PhD thesis of Christopher John Cornish Hellaby Watkins, King's College, Cambridge, England, 1989, 241 pages.

Office Action in Chinese Appln. No. 201780078702.3, dated Aug. 22, 2023, 6 pages (with English translation).

* cited by examiner

ENVIRONMENT PREDICTION USING REINFORCEMENT LEARNING

CROSS-REFERENCE TO RELATED APPLICATIONS

This application is a continuation application, and claims the benefit of priority under 35 USC 120, of U.S. patent application Ser. No. 16/403,314, filed on May 3, 2019, which is a continuation application of, and claims priority to, PCT Patent Application No. PCT/M2017/056902, filed on Nov. 4, 2017, which application claims the benefit under 35 U.S.C. § 119(e) of U.S. Patent Application No. 62/418,159, filed Nov. 4, 2016. The disclosure of each of the foregoing applications is incorporated herein by reference.

BACKGROUND

This specification relates to prediction using a machine learning model.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that determines an estimate of an aggregate reward resulting from an environment being in an initial state by generating value predictions over a series of internal planning steps.

According to a first aspect there is provided a system comprising: a state representation neural network that is configured to: receive one or more observations characterizing states of an environment being interacted with by an agent, and process the one or more observations to generate an internal state representation of a current environment state; a prediction neural network that is configured to, for each of a plurality of internal time steps: receive an internal state representation for the internal time step; and process the internal state representation for the internal time step to generate: an internal state representation for a next internal time step, and a predicted reward for the next internal time step; a value prediction neural network that is configured to, for each of the plurality of internal time steps: receive the internal state representation for the internal time step, and process the internal state representation for the internal time step to generate a value prediction that is an estimate of a future cumulative discounted reward from a next internal time step onwards; and a predictron subsystem that is configured to: receive one or more observations characterizing states of the environment; provide the one or more observations as input to the state representation neural network to generate an internal state representation of the current environment state; for each of the plurality of internal time steps: generate, using the prediction neural network and the value prediction neural network and from the internal state representation for the internal time step: an internal state representation for the next internal time step, a predicted reward for the next internal time step, and a value prediction; and determine an aggregate reward from the predicted rewards and the value predictions for the internal time steps.

In a related aspect there is provided system implemented by one or more computers, the system comprising: a state representation neural network that is configured to: receive an observation characterizing a state of an environment being interacted with by an agent, and process the observation to generate an internal state representation of the environment state; a prediction neural network that is configured to: receive a current internal state representation of a current environment state; and process the current internal state representation to generate: a predicted subsequent state representation of a subsequent state of the environment, and a predicted reward for the subsequent state; and a value prediction neural network that is configured to: receive a current internal state representation of a current environment state, and process the current internal state representation to generate a value prediction that is an estimate of a future cumulative discounted reward from the current environment state onwards.

In a preferred implementation of the related aspect, the system includes a predictron subsystem that is configured to: receive an initial observation characterizing an initial state of the environment; provide the initial observation as input to the state representation neural network to generate an initial internal state representation of the environment state; for each of a plurality of internal time steps: generate, using the prediction neural network and the value prediction neural network and from a current state representation, a predicted subsequent state representation, a predicted reward, and a value prediction; and determine an aggregate reward from the predicted rewards and the value predictions for the time steps Thus as described herein the system may integrate a model of the environment with a planning model. This is here termed predictron system; in some implementations the predictron system employs a predictron sub-system as described above. The predictron subsystem may be further configured to provide the aggregate reward as an estimate of a reward resulting from the environment being in the current state. The internal time steps may be considered as planning steps. The future cumulative discounted reward may comprise an estimate of a future reward for a plurality of future time steps, and thus it may be cumulative. A reward may be discounted by giving the rewards weights and weighting a reward at a later time step less than a reward at an earlier time step.

In some implementations, the prediction neural network is further configured to generate a predicted discount factor for the next internal time step, and the predictron subsystem is configured to use the predicted discount factors for the internal time steps in determining the aggregate reward. A reward may be discounted by weighting a future reward by a product of discount factors, each between 0 and 1, one for each successive time step. The predictron subsystem may be used to predict the discount factors. The aggregate reward may be determined by an accumulator, as described later.

In some implementations, the system further comprises: a lambda neural network that is configured to, for each of the internal time steps, process an internal state representation for a current internal time step to generate a lambda factor for a next internal time step, and the predictron subsystem is configured to determine return factors for the internal time steps and use the lambda factors to determine weights for the return factors in determining the aggregate reward. A return factor may comprise a predicted return for an internal planning time step. This may be determined from a combination of the predicted reward, predicted discount factor, and value prediction; it may be determined for each of k future internal time i.e. planning steps.

In some implementations, the state representation neural network is a recurrent neural network.

In some implementations, the state representation neural network is a feedforward neural network.

In some implementations, the prediction neural network is a recurrent neural network.

In some implementations, the prediction neural network is a feedforward neural network that has different parameter values at each of the plurality of time steps.

According to a second aspect, there is provided a method comprising the respective operations performed by the predictron subsystem.

According to a third aspect, there is provided a method of training the system comprising: determining a gradient of a loss that is based on the aggregate reward and an estimate of a reward resulting from the environment being in the current state; and backpropagating the gradient of the loss to update current values of parameters of the state representation neural network, the prediction neural network, the value prediction neural network, and the lambda neural network.

According to a fourth aspect, there is provided a method for training the system comprising: determining a gradient of a consistency loss that is based on consistency of the return factors determined by the predictron subsystem for the internal time steps; and backpropagating the gradient of the consistency loss to update current values of parameters of the state representation neural network, the prediction neural network, the value prediction neural network, and the lambda neural network.

Particular embodiments of the subject matter described in this specification can be implemented so as to realize one or more of the following advantages. A predictron system as described in this specification jointly learns a model of the environment (i.e. the state representation neural network and the prediction neural network of the system) and a planning model (i.e. the value prediction neural network and, where employed, the lambda neural network), where the planning model generates a value function that estimates cumulative reward. Conventional systems separately learn the model of the environment and the planning model, and therefore in conventional systems the model is not well-matched to the planning task. In contrast, for the predictron system described in this specification, the environment model and the planning model are jointly learned, and the system is therefore able to generate value functions that contribute to estimating the outcome associated with the current state of the environment more accurately than conventional systems.

Moreover, unlike conventional systems, the predictron system as described in this specification can be trained in part by unsupervised learning methods, i.e. based on observations characterizing states of an environment where the outcome associated with the current state of the environment is not known. Therefore, due to auxiliary unsupervised training, the system as described in this specification generates value functions that contribute to estimating the outcome associated with the current state of the environment more accurately than conventional systems. Furthermore, less labelled training data is required for training the predictron system as described in this specification than is required for training conventional systems since, unlike conventional systems, the predictron system can be trained by auxiliary unsupervised training.

Furthermore, the predictron system as described in this specification generates an output based on an adaptive number of planning steps depending on the internal state representation and internal dynamics of the system. In particular, in some cases, the predictron system may generate an output based on fewer planning steps than the total possible number of planning steps, and therefore consume fewer computational resources (e.g., using less computing power and computing time) than conventional systems that generate outputs based on utilizing every planning step in all cases.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
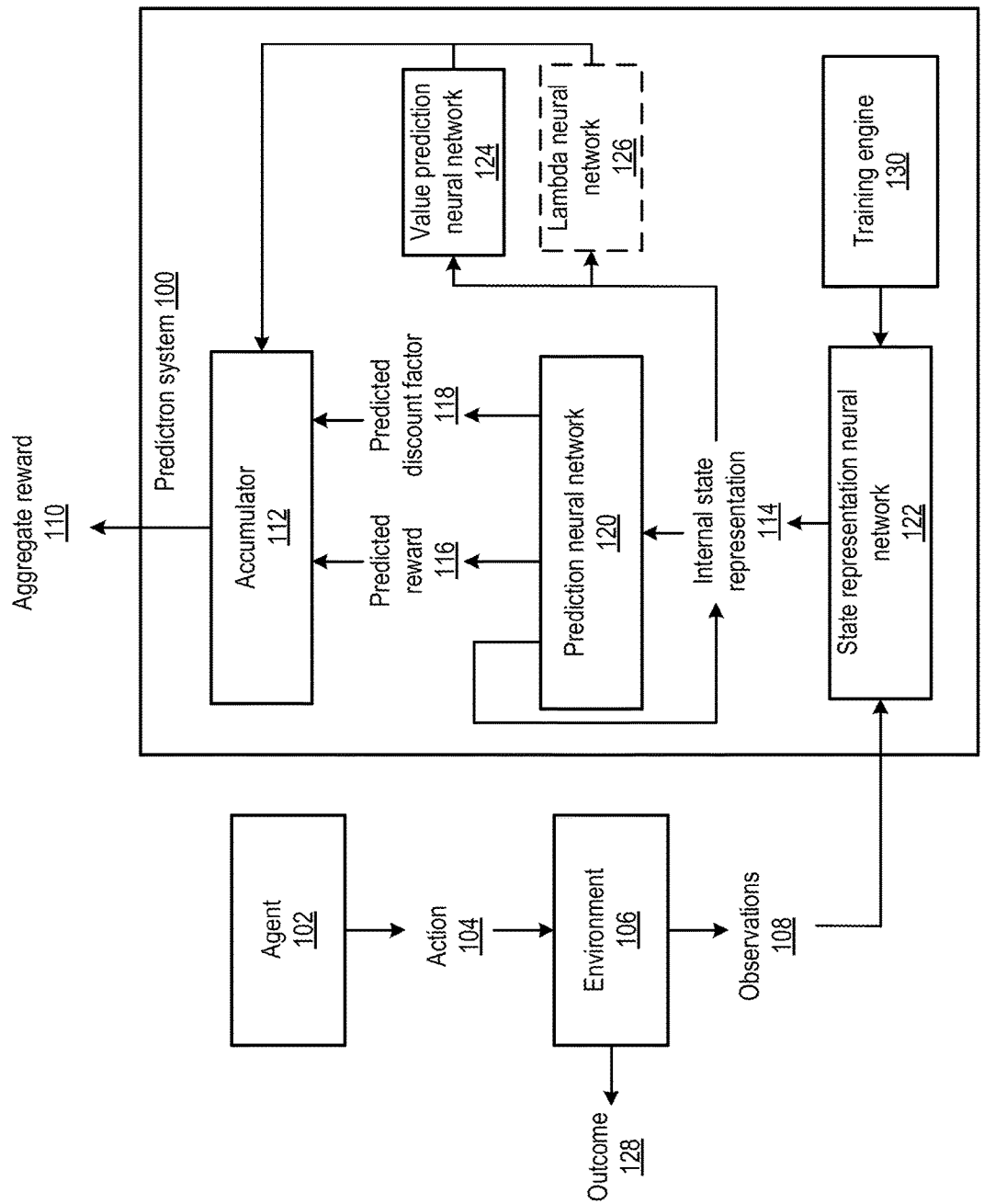
FIG. 1 shows an example predictron system.

FIG. 1 shows an example predictron system 100. The predictron system 100 is an example of a system implemented as computer programs on one or more computers in one or more locations in which the systems, components, and techniques described below are implemented.

The system 100 estimates the effects of actions 104 performed by an agent 102 interacting with an environment 106.

In some implementations, the environment 106 is a simulated environment and the agent 102 is implemented as one or more computer programs interacting with the simulated environment. For example, the simulated environment may be a video game and the agent 102 may be a simulated user playing the video game. As another example, the simulated environment may be a motion simulation environment, e.g., a driving simulation or a flight simulation, and the agent 102 is a simulated vehicle navigating through the motion simulation.

In some other implementations, the environment 106 is a real-world environment and the agent 102 is a mechanical agent interacting with the real-world environment. For example, the agent 102 may be a robot interacting with the environment to accomplish a specific task. As another example, the agent 102 may be an autonomous or semi-autonomous vehicle navigating through the environment 106.

The system 100 outputs an aggregate reward 110 as an estimate of an outcome 128 associated with a current state of an environment 106 being interacted with by an agent 102. The system 100 generates the aggregate reward 110 by accumulating predicted rewards 116, predicted discount factors 118, and value predictions over multiple internal time steps, referred to in this specification as planning steps.

The outcome 128 can encode any event or aspect of the environment 106 being interacted with by the agent 102. For example, the outcome 128 may include binary values indicating whether an agent navigating in an environment reaches particular locations in the environment starting from a current state of the environment 106. As another example, the outcome 128 may include values indicating a cumulative reward received by an agent 102 navigating in an environment 106 based on the agent 102 accomplishing certain tasks, e.g. reaching certain locations in the environment 106, starting from a current state of the environment 106.

Once trained, the system 100 can be used, for example, to select actions 104 to be performed by the agent 102. For example, if the outcome 128 includes a value rating the success of the interaction of the agent 102 with the environment 106, e.g. a value representing the amount of time it takes for the agent to accomplish a task starting from a current state of the environment, then the action 104 of the agent 102 may be selected as an action that that is predicted by the system 100 to optimize the component of the outcome 128 corresponding to the value.

The system 100 includes a prediction neural network 120 that, for each planning step, is configured to process an input to generate as output: (i) an internal state representation 114 for the next planning step, i.e. the planning step following the current planning step (ii) a predicted reward 116 for the next planning step, and (iii) a predicted discount factor 118 for the next planning step. For the first planning step, the prediction neural network 120 receives as input the internal state representation 114 generated by a state representation neural network 122, and for subsequent planning steps, the prediction neural network 120 receives as input the internal state representation 114 generated by the prediction neural network 120 at the previous planning step. The predicted reward 116, the predicted discount factor 118, and the outcome 128 can be scalars, vectors, or matrices, and in general all have the same dimensionality. Generally the entries of the predicted discount factor 118 are all values between 0 and 1. The internal state representation 114, the predicted reward 116, and the predicted discount factor 118 are abstract representations used by the system to facilitate prediction of the outcome 128 associated with the current state of the environment 106.

The state representation neural network 122 is configured to receive as input a sequence of one or more observations 108 of the environment 106 and to process the observations in accordance with the values of a set of state representation neural network parameters to generate as output the internal state representation 114 for the first planning step. In general, the dimensionality of the internal state representation 114 may be different from the dimensionality of the one or more observations 108 of the environment 106.

In some implementations, the observations 108 may be generated by or derived from sensors of the agent 102. For example, the observation 108 may be images captured by a camera of the agent 102. As another example, the observations 108 may be derived from data captured from a laser sensor of the agent 102. As another example, the observations 108 may be hyperspectral images captured by a hyperspectral sensor of the agent 102.

The system 100 includes a value prediction neural network 124 that, for each planning step, is configured to process the internal state representation 114 for the planning step to generate a value prediction for the next planning step. The value prediction for a planning step is an estimate of the future cumulative discounted reward from the next planning step onwards, i.e. the value prediction can be an estimate, rather than a direct computation, of the following sum:

$$v_k = r_{k+1} + \gamma_{k+1} r_{k+2} + \gamma_{k+1}\gamma_{k+2} r_{k+3} + \cdots$$

where $v_k$ is the value prediction at planning step k, $r_i$ is the predicted reward 116 at planning step i, and $\gamma_i$ is the predicted factor 118 at planning step i.

The aggregate reward 110 is generated by the accumulator 112, and is an estimate of the outcome 128 associated with the current state of the environment 106. The aggregate reward 110 can be a scalar, vector, or matrix, and has the same dimensionality as the outcome 128. In some implementations, the accumulator 112 generates the aggregate reward 110 by a process referred to in this specification as k-step prediction, where k is an integer between 1 and K, and K is the total number of planning steps. In these implementations, the accumulator 112 generates the aggregate reward 110 by combining the predicted reward 116 and the predicted discount factor 118 for each of the first k planning steps, and the value prediction of the k-th planning step, to determine an output referred to in this specification as the k-step return. For k-step prediction, generally the aggregate reward 110 is determined as the k-step prediction corresponding to the final planning step K. In some implementations, the accumulator 112 generates the aggregate reward 110 by a process referred to in this specification as λ-weighted prediction. In these implementations, the system 100 includes a lambda neural network 126, that is configured to, for each of the planning steps, process the internal state representation 114 to generate a lambda factor for the planning step, where the lambda factor can be a scalar, vector, or matrix, and generally has the same dimensionality as the outcome 128. In some cases, the entries of the lambda factor are all values between 0 and 1. In these implementations, the accumulator 112 generates the aggregate reward 110 by determining the k-step return for each planning step k and combining them according to weights defined by the lambda factors to determine an output referred to in this specification as the λ-weighted return. Determining an aggregate reward output is further described with reference to FIG. 2.

The system 100 is trained by a training engine 130 based on a set of training data including observations 108 and corresponding outcomes 128. In particular, the training engine 130 backpropagates gradients determined based on a loss function, for example by stochastic gradient descent, to jointly optimize the values of the sets of parameters of the value prediction neural network 124, the state representation neural network 122, the prediction neural network 120, and in λ-weighted prediction implementations, the lambda neural network 126. Training the system 100 involves supervised training, and in some cases, auxiliary unsupervised training.

In supervised training of the system 100, the loss function depends on the outcome 128 corresponding to the observations 108 provided as input and processed by the system 100. For example, in the k-step prediction implementation, the supervised loss function may measure a difference between the outcome 128 and the k-step return generated by the accumulator 112. As another example, in the λ-weighted prediction implementation, the supervised loss function may measure a difference between the outcome 128 and the λ-weighted return generated by the accumulator 112.

In unsupervised training of the system 100, the loss function does not depend on the outcome 128 corresponding to the observations 108 provided as input and processed by the system 100. For example, in the λ-weighted prediction implementation, the unsupervised loss function may be a consistency loss function measuring a difference between each k-step return and the λ-weighted return. In this case, unsupervised training jointly adjusts the values of the parameters of the neural networks of the system 100 to decrease a difference between individual k-step returns and the λ-weighted return, making the k-step returns self-consistent and thereby increasing the robustness of the system 100. Training of the system 100 by the training engine 130 is further described with reference to FIG. 3.

Data structures referred to in this specification such as matrices and vectors, e.g. the outputs of any of the neural networks of the system 100, can be represented in any format that allows the data structures to be used in the manner described in the specification (e.g. an output of a neural network described as a matrix may be represented as a vector of the entries of the matrix).

Figure 2:
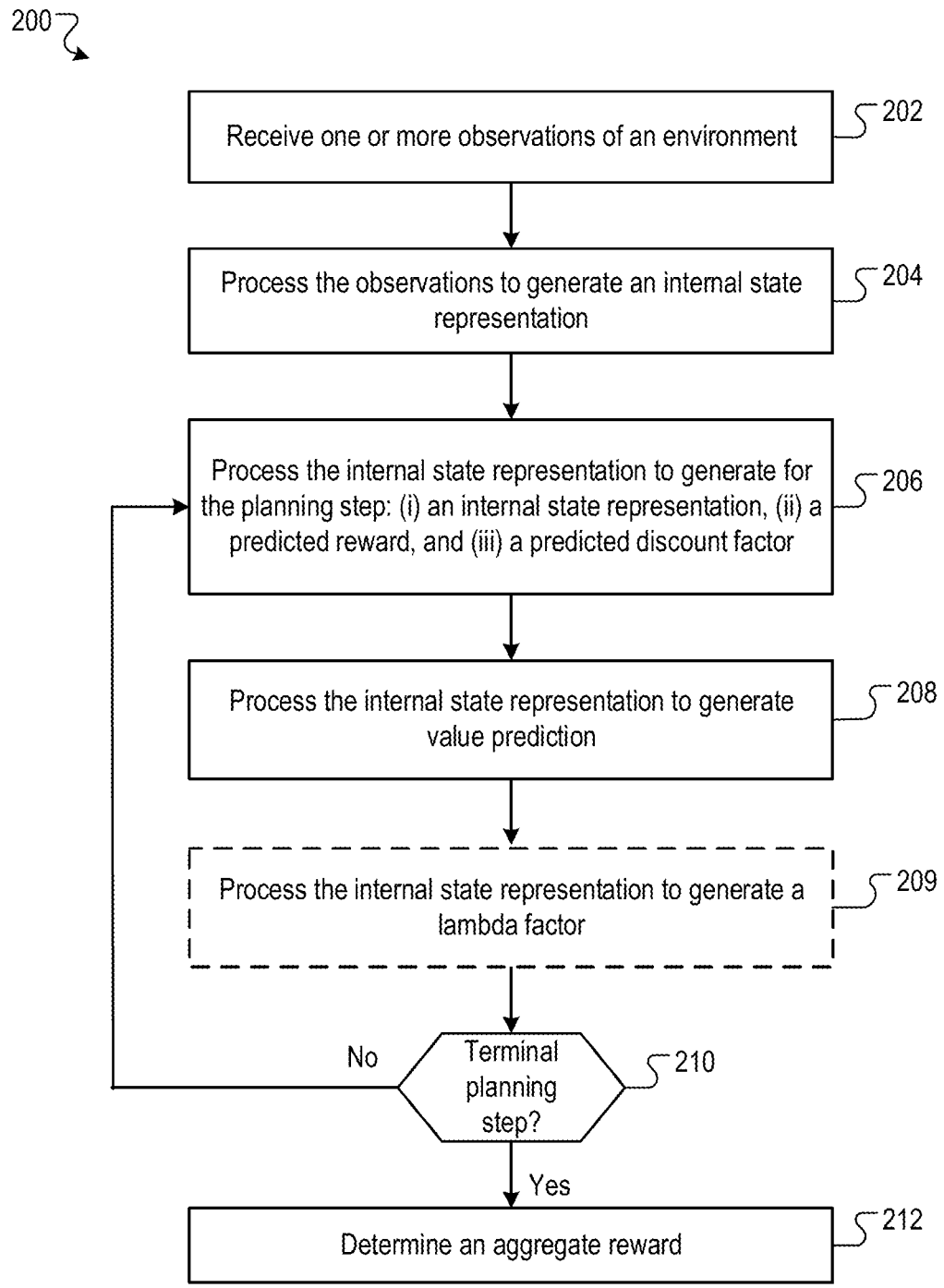
FIG. 2 is a flow diagram of an example process for determining an aggregate reward output.

FIG. 2 is a flow diagram of an example process 200 for determining an aggregate reward output. For convenience, the process 200 will be described as being performed by a system of one or more computers located in one or more locations. For example, a predictron system, e.g., the predictron system 100 of FIG. 1, appropriately programmed in accordance with this specification, can perform the process 200.

The system receives one or more observations of an environment being interacted with by an agent (step 202).

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation.

In some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment.

In some implementations, the observations may be generated by or derived from sensors of the agent. For example, the observation may be images captured by a camera of the agent. As another example, the observations may be derived from data captured from a laser sensor of the agent. As another example, the observations may be hyperspectral images captured by a hyperspectral sensor of the agent.

The state representation neural network receives the one or more observations of the environment as input, and process the input in accordance with the values of the set of state representation neural network parameters, to generate as output an internal state representation for the first planning step (step 204).

In some implementations, the state representation neural network is a recurrent neural network, and the output of the state representation neural network is the output of the recurrent neural network after sequentially processing each of the observations. In some other implementations, the state representation neural network is a feedforward neural network, and the output of the state representation neural network is the output of the final layer of the feedforward neural network. In implementations where the state representation neural network is a feedforward neural network, the system may concatenate the one or more observations prior to providing them as input to the state representation neural network 122.

For each planning step, the prediction neural network processes an input to generate as output: (i) an internal state representation for the next planning step (ii) a predicted reward for the next planning step, and (iii) a predicted discount factor for the next planning step (step 206). For the first planning step, the prediction neural network receives as input the internal state representation generated by the state representation neural network, and for subsequent planning steps, the prediction neural network receives as input the internal state representation generated by the prediction neural network at the previous planning step. The predicted reward and predicted discount factor may be scalars, vectors, or matrices, and generally have the same dimension as the outcome. Generally the entries of the discount factor are all values between 0 and 1. The internal state representation for a planning step is an abstract representation of the environment used by the system to facilitate prediction of the outcome.

In some implementations, the prediction neural network is a recurrent neural network. In some other implementations, for the prediction neural network is a feedforward neural network that has different parameter values corresponding to each of the planning steps. In some implementations, the prediction neural network includes a sigmoid non-linearity layer to cause the values of the entries of the discount factor to lie in the range 0 to 1.

For each planning step, the value prediction neural network process an input to generate a value prediction for the next planning step (step 208). For the first planning step, the value prediction neural network receives as input the internal state representation generated by the state representation neural network, and for subsequent planning steps, the value prediction neural network receives as input the internal state representation generated by the prediction neural network at the previous planning step. The value prediction for a planning step is an estimate of the future cumulative discounted reward from the next internal time step onwards.

In some implementations, the value prediction neural network shares parameter values with the prediction neural network, i.e. the value prediction neural network receives as input an intermediate output of the prediction neural network generated as a result of processing an internal state representation. An intermediate output of the prediction neural network refers to activations of one or more units of one or more hidden layers of the prediction neural network.

In implementations where the accumulator determines the aggregate reward by λ-weighted prediction, the lambda neural network processes an input to generate a lambda factor for the next planning step (step 209). For the first planning step, the lambda neural network receives as input the internal state representation generated by the state representation neural network, and for subsequent planning steps, the lambda neural network receives as input the internal state representation generated by the prediction neural network at the previous planning step. The lambda factor can be a scalar, a vector, or a matrix, and generally has the same dimensionality as the outcome. In some cases the values of the entries of the lambda factor are between 0 and 1. In some implementations, the lambda neural network includes a sigmoid non-linearity layer to cause the values of the entries of the lambda factor to lie in the range 0 to 1. In some implementations, the lambda neural network shares parameter values with the prediction neural network.

The system determines whether the current planning step is the terminal planning step (step 210). In some cases, the current planning step may be the terminal planning step if it is the last planning step of the pre-determined number of planning steps. In the λ-weighted prediction implementation, the current planning step may be the terminal planning step if the λ-factor for the current planning step is identically zero (i.e., the λ-factor is zero if it is a scalar, or every entry of the λ-factor is zero if it is a vector or matrix), as will be described further below. In response to determining that the current planning step is not the terminal planning step, the system advances to the next planning step, returns to step 206, and repeats the preceding steps. In response to determining that the current planning step is the terminal planning step, the accumulator determines the aggregate reward (step 212).

In some implementations, the accumulator determines the aggregate reward by k-step prediction, where k is an integer between 1 and K, where K is the total number of planning steps. In these implementations, the accumulator generates the aggregate reward by combining the predicted reward and the predicted discount factor for each of the first k planning steps, and the value prediction of the k-th planning step, to determine the k-step return as output. Specifically, the accumulator determines the k-step return as:

$$g_k = r_1 + \gamma_1(r_2 + \gamma_2( \ldots + \gamma_{k-1}(r_k + \gamma_k v_k) \ldots ))$$

where $g_k$ is the k-step return, $r_i$ is the reward of planning step i, $\gamma_i$ is the discount factor of planning step i, and $v_k$ is the value prediction of planning step k.

In some other implementations, the accumulator determines the aggregate reward by λ-weighted prediction. In these implementations, the accumulator determines the k-step return for each planning step k and combines them according to weights defined by the lambda factors to determine the λ-weighted return as output. Specifically, the accumulator may determine the λ-weighted return as:

$$g_\lambda = \sum_{k=0}^{K} w_k g_k, \text{ where } w_k = \begin{cases} (1-\lambda_k)\prod_{j=0}^{k-1} \lambda_j & \text{if } k < K \\ \prod_{j=0}^{K-1} \lambda_j & \text{if } k = K \end{cases}$$

where $g_\lambda$ is the λ-weighted return, $\lambda_k$ is the λ-factor for the k-th planning step, $w_k$ is a weight factor, 1 is the identity matrix, i.e. a matrix with ones on the diagonal and zero elsewhere, and $g_k$ is the k-step return. The accumulator may also determine the λ-weighted return by a backward accumulation through intermediate steps $g_{k,\lambda}$, where:

$$g_{k,\lambda} = (1-\lambda_k)v_k + \lambda_k(r_{k+1} + \gamma_{k+1} g_{k+1,\lambda}) \text{ and } g_{K,\lambda} = v_K,$$

and the λ-weighted return $g_\lambda$ is determined as $g_{0,\lambda}$.

The system may compute the λ-weighted return $g_\lambda$ based on a sequence of consecutive planning steps that does not include all K planning steps. For example, in the example formulation of $g_\lambda$ previously provided, if $\lambda_k=0$ for a planning step k, then $g_\lambda$ is determined based on the k-step returns of the first k planning steps and not the subsequent planning steps, since the weights $w_n$ are zero for n>k. Therefore the system determines the aggregate reward based on an adaptive number of planning steps depending on the internal state representation and learning dynamics of the system.

Figure 3:
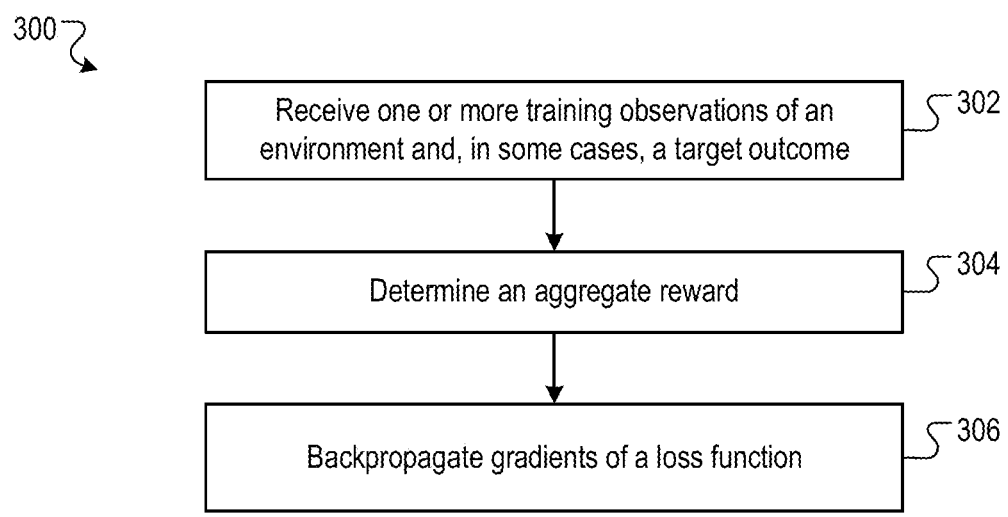
FIG. 3 is a flow diagram of an example process for training of a predictron system.

FIG. 3 is a flow diagram of an example process 300 for training a predictron system. For convenience, the process 300 will be described as being performed by an engine including one or more computers located in one or more locations. For example, a training engine, e.g. the training engine 130 of FIG. 1, appropriately programmed in accordance with this specification, can perform the process 300.

The engine receives one or more observations of the environment being interacted with by an agent and, in some cases, a corresponding outcome associated with the current state of the environment (step 302).

The engine provides the observations to the system, and the system determines an aggregate reward that is an estimate of the outcome. An example process for determining the aggregate reward is described with reference to FIG. 2.

The engine determines gradients based on a loss function and backpropagates the gradients to jointly update the values of the sets of parameters of the neural networks of the system, i.e. the value prediction neural network, the state representation neural network, the prediction neural network, and in λ-weighted prediction implementations, the lambda neural network. The loss function may be a supervised loss function, i.e. a loss function that depends on the outcome corresponding to the observations provided as input and processed by the system, an unsupervised loss function, i.e. a loss function does not depend on the outcome, or a combination of supervised and unsupervised loss terms.

In the k-step prediction implementation, a supervised loss function may be given by:

$$|g-g_k|_2^2,$$

where g is the outcome. As another example, in the λ-weighted prediction implementation, the supervised loss function used to backpropagate gradients into the lambda neural network may be given by:

$$|g-g_\lambda|_2^2,$$

while the supervised loss function used to backpropagate gradients into the value prediction neural network, the state representation neural network, and the prediction neural network may be given by:

$$\sum_{k=0}^{K} |g - g_k|_2^2,$$

or by:

$$\Sigma_{k=0}^{K} w_k |g-g_k|_2^2.$$

In the λ-weighted prediction implementation, the unsupervised loss function may be given by:

$$\sum_{k=0}^{K} |g_\lambda - g_k|_2^2,$$

where $g_\lambda$ is considered fixed, and gradients are backpropagated to make each k-step return $g_k$ more similar to $g_\lambda$, but not vice-versa. Backpropagating gradients based on the unsupervised loss function decreases the difference between the k-step returns and the λ-weighted return, making the k-step returns self-consistent and thereby increasing robustness of the system. Furthermore, since the unsupervised loss function does not depend on the outcome corresponding to the observations provided as input and processed by the system, the engine may train the system by backpropagating gradients based on the unsupervised loss function for sequences of observations where the corresponding outcome is not known.

For training observations where the corresponding outcome is known, the engine may update the values of the sets of parameters of the neural networks of the system based on a loss function that combines both a supervised loss term and an unsupervised loss term. For example, the loss function may be a weighted linear combination of the supervised loss term and the unsupervised loss term.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for estimating an outcome associated with an environment being interacted with by an agent to perform a task by aggregating reward and value predictions over a sequence of internal time steps, the method comprising:
receiving one or more observations characterizing states of the environment being interacted with by the agent;
processing the one or more observations using a state representation neural network to generate an internal state representation for a first internal time step of the sequence of internal time steps;
for each internal time step in the sequence of internal time steps, processing an internal state representation for the internal time step using a prediction neural network to generate: (i) an internal state representation for processing by the prediction neural network at a next internal time step, and (ii) a predicted reward for the next internal time step;
for each of one or more internal time steps in the sequence of internal time steps, processing the internal state representation for the internal time step using a value prediction neural network to generate a value prediction that is an estimate of a future cumulative discounted reward received after the internal time step; and
determining an estimate of the outcome associated with the environment by aggregating the predicted rewards and the value predictions for the internal time steps,
wherein the sequence of internal time steps define a sequence of computational steps; and
wherein the state representation neural network, the prediction neural network, and the value prediction neural network have been jointly trained using a loss function that causes the state representation neural network and the prediction neural network to generate internal state representations that increase an accuracy of estimated outcomes determined by processing the internal state representations using the value prediction neural network.

2. The method of claim 1, wherein the agent is a robotic agent interacting with a real-world environment.

3. The method of claim 1, wherein the outcome associated with the environment characterizes an effectiveness of the agent in performing the task.

4. The method of claim 1, wherein each observation characterizing a state of the environment being interacted with by the agent comprises a respective image of the environment.

5. The method of claim 1, wherein for each internal time step in the sequence of internal time steps, the prediction neural network further generates a predicted discount factor for the next internal time step, and wherein determining the estimate of the outcome associated with the environment further comprises:

determining the estimate of the outcome associated with the environment by aggregating the predicted discount factors for the internal time steps in addition to the predicted rewards and the value predictions for the internal time steps.

6. The method of claim 5, wherein determining the estimate of the outcome associated with the environment comprises combining: (i) the predicted reward and the predicted discount factor for each internal time step, and (ii) a value prediction for a last internal time step.

7. The method of claim 6, wherein the estimate of the outcome associated with the environment satisfies:

$$g_k = r_1 + \gamma_1(r_2 + \gamma_2( \ldots + \gamma_{k-1}(r_k + \gamma_k v_k) \ldots ))$$

where $g_K$ is the estimate of the outcome, K is a number of internal time steps in the sequence of internal time, $r_i$ is the predicted reward for internal time step i in the sequence of internal time steps, $\gamma_i$ is the predicted discount factor for internal time step i in the sequence of internal time steps, and $v_K$ is the value prediction for the last internal time step.

8. The method of claim 5, further comprising, for each internal time step in the sequence of internal time steps, processing the internal state representation for the internal time step using a lambda neural network to generate a lambda factor for the next internal time step, and wherein determining the estimate of the outcome associated with the environment comprises:

determining the estimate of the outcome based on the lambda factors for the internal time steps in addition to the predicted discount factors, the predicted rewards, and the value predictions for the internal time steps.

9. The method of claim 8, wherein the estimate of the outcome associated with the environment satisfies:

$$g_\lambda = \Sigma_{k=0}^{K} w_k g_k$$

where $g_\lambda$ is the estimate of the outcome, k indexes the internal time steps in the sequence of internal time steps, K is the index of a last internal time step in the sequence of internal time steps, $w_k$ is a weight factor associated with internal time step k that is determined based on the lambda factors for the internal time steps, and $g_k$ is a k-step return associated with internal time step k that is determined based on the predicted rewards, the value predictions, and the predicted discount factors for the internal time steps.

10. The method of claim 9, wherein for each $k \in \{1, \ldots, K\}$, the k-step return $g_k$ associated with internal time step k satisfies:

$$g_k = r_1 + \gamma_1(r_2 + \gamma_2( \ldots + \gamma_{k-1}(r_k + \gamma_k v_k) \ldots ))$$

where $r_i$ is the predicted reward for internal time step i in the sequence of internal time steps, $\gamma_i$ is the predicted discount factor for internal time step i in the sequence of internal time steps, and $v_k$ is a value prediction for internal time step k in the sequence of internal time steps, wherein the 0-step return $g_0$ is equal to a value prediction for the first internal time step in the sequence of internal time steps.

11. The method of claim 9, wherein for each $k \in \{0, \ldots, K\}$, the weight factor $w_k$ associated with internal time step k satisfies:

$$w_k = \begin{cases} (1-\lambda_k) \prod_{j=0}^{k-1} \lambda_j & \text{if } k < K \\ \prod_{j=0}^{K-1} \lambda_j & \text{if } k = K \end{cases}$$

where $\lambda_j$ is the lambda factor for internal time step j.

12. The method of claim 1, wherein the state representation neural network comprises a feedforward neural network.

13. The method of claim 1, wherein the prediction neural network comprises a recurrent neural network.

14. The method of claim 1, wherein the prediction neural network comprises a feedforward neural network that has different parameter values at each internal time step.

15. A system comprising:
one or more computers; and
one or more storage devices communicatively coupled to the one or more computers, wherein the one or more storage devices store instructions that, when executed by the one or more computers, cause the one or more computers to perform operations for estimating an outcome associated with an environment being interacted with by an agent to perform a task by aggregating reward and value predictions over a sequence of internal time steps, the operations comprising:
receiving one or more observations characterizing states of the environment being interacted with by the agent;
processing the one or more observations using a state representation neural network to generate an internal state representation for a first internal time step of the sequence of internal time steps;
for each internal time step in the sequence of internal time steps, processing an internal state representation for the internal time step using a prediction neural network to generate: (i) an internal state representation for processing by the prediction neural network at a next internal time step, and (ii) a predicted reward for the next internal time step;
for each of one or more internal time steps in the sequence of internal time steps, processing the internal state representation for the internal time step using a value prediction neural network to generate a value prediction that is an estimate of a future cumulative discounted reward received after the internal time step; and
determining an estimate of the outcome associated with the environment by aggregating the predicted rewards and the value predictions for the internal time steps,
wherein the sequence of internal time steps define a sequence of computational steps; and
wherein the state representation neural network, the prediction neural network, and the value prediction neural network have been jointly trained using a loss function that causes the state representation neural network and the prediction neural network to generate internal state representations that increase an accuracy of estimated outcomes determined by processing the internal state representations using the value prediction neural network.

16. The system of claim 15, wherein the agent is a robotic agent interacting with a real-world environment.

17. The system of claim 15, wherein the outcome associated with the environment characterizes an effectiveness of the agent in performing the task.

18. The system of claim 15, wherein each observation characterizing a state of the environment being interacted with by the agent comprises a respective image of the environment.

19. The system of claim 15, wherein for each internal time step in the sequence of internal time steps, the prediction neural network further generates a predicted discount factor for the next internal time step, and wherein determining the estimate of the outcome associated with the environment further comprises:
   determining the estimate of the outcome associated with the environment by aggregating the predicted discount factors for the planning steps in addition to the predicted rewards and the value predictions for the planning steps.

20. One or more non-transitory computer storage media storing instructions that when executed by one or more computers cause the one or more computers to perform operations for estimating an outcome associated with an environment being interacted with by an agent to perform a task by aggregating reward and value predictions over a sequence of internal time steps, the operations comprising:
   receiving one or more observations characterizing states of the environment being interacted with by the agent;
   processing the one or more observations using a state representation neural network to generate an internal state representation for a first internal time step of the sequence of internal time steps;
   for each internal time step in the sequence of internal time steps, processing an internal state representation for the internal time step using a prediction neural network to generate: (i) an internal state representation for processing by the prediction neural network at a next internal time step, and (ii) a predicted reward for the next internal time step;
   for each of one or more internal time steps in the sequence of internal time steps, processing the internal state representation for the internal time step using a value prediction neural network to generate a value prediction that is an estimate of a future cumulative discounted reward received after the internal time step; and
   determining an estimate of the outcome associated with the environment by aggregating the predicted rewards and the value predictions for the internal time steps,
   wherein the sequence of internal time steps define a sequence of computational steps; and
   wherein the state representation neural network, the prediction neural network, and the value prediction neural network have been jointly trained using a loss function that causes the state representation neural network and the prediction neural network to generate internal state representations that increase an accuracy of estimated outcomes determined by processing the internal state representations using the value prediction neural network.

* * * * *